United States Patent
Miller et al.

(10) Patent No.: US 9,568,055 B2
(45) Date of Patent: Feb. 14, 2017

(54) CLIP FOR USE IN A DISC BRAKE ASSEMBLY AND DISC BRAKE ASSEMBLY INCLUDING SUCH A CLIP

(75) Inventors: Harry Miller, Canton, MI (US); Mauro Marconcin, South Lyon, MI (US); Kraig Gerber, Plymouth Township, MI (US); Joseph Willey, Canton, MI (US); Eduardo Morais, South Lyon, MI (US)

(73) Assignee: Kelsey-Hayes Company, Livonia, MI (US)

( * ) Notice: Subject to any disclaimer, the term of this patent is extended or adjusted under 35 U.S.C. 154(b) by 545 days.

(21) Appl. No.: 13/359,124

(22) Filed: Jan. 26, 2012

(65) Prior Publication Data

US 2013/0192938 A1    Aug. 1, 2013

(51) Int. Cl.
*F16D 65/40*    (2006.01)
*F16D 65/097*   (2006.01)

(52) U.S. Cl.
CPC .................................. *F16D 65/0978* (2013.01)

(58) Field of Classification Search
CPC .......... B60T 1/06; F16D 55/22; F16D 65/095; F16D 65/0978
USPC ......................... 188/71.1, 73.31, 73.1, 73.35, 73.36, 188/73.37, 73.38, 250 E
See application file for complete search history.

(56) References Cited

U.S. PATENT DOCUMENTS

| | | | |
|---|---|---|---|
| 5,687,817 A * | 11/1997 | Kobayashi et al. | 188/72.3 |
| 5,699,882 A * | 12/1997 | Ikegami et al. | 188/73.38 |
| 5,901,815 A * | 5/1999 | Kobayashi et al. | 188/7 |
| 5,941,348 A * | 8/1999 | Matsumoto et al. | 188/73.38 |
| 5,947,233 A * | 9/1999 | Kobayashi et al. | 188/72.3 |
| 6,223,866 B1 | 5/2001 | Giacomazza | |
| 6,286,636 B1 * | 9/2001 | Iwata | 188/73.31 |
| 6,478,122 B1 * | 11/2002 | Demoise et al. | 188/73.38 |
| 6,481,544 B2 * | 11/2002 | Brecht et al. | 188/250 E |
| 6,527,090 B1 * | 3/2003 | Barillot et al. | 188/73.38 |
| 7,040,464 B1 | 5/2006 | Andrews | |
| 7,086,506 B2 | 8/2006 | Wemple et al. | |
| 7,299,903 B2 | 11/2007 | Rockwell et al. | |
| 7,578,374 B2 * | 8/2009 | Takeo et al. | 188/73.38 |
| 2007/0017756 A1 | 1/2007 | Takeo et al. | |

(Continued)

FOREIGN PATENT DOCUMENTS

CN    1384904 A    12/2002
EP    1600653 A1   11/2005

(Continued)

OTHER PUBLICATIONS

International Search Report for PCT/US2013/022862 dated Jun. 14, 2013.

(Continued)

*Primary Examiner* — Christopher Schwartz
(74) *Attorney, Agent, or Firm* — MacMillan, Sobanski & Todd, LLC

(57) ABSTRACT

This invention relates to a brake clip for use with a disc brake assembly. The brake clip includes a U-shaped section having a base leg with opposing first and second legs extending from the base leg. An abutment leg extends from at least one of the first and second legs of the U-shaped section. An extension leg extends from the abutment leg. The abutment leg is in contact with an anchor bracket of the disc brake assembly and the extension leg is in contact with a brake pad of the disc brake assembly when the brake clip is disposed therebetween.

26 Claims, 8 Drawing Sheets

(56) References Cited

U.S. PATENT DOCUMENTS

2009/0277729 A1* 11/2009 Kim .......................... 188/73.38

FOREIGN PATENT DOCUMENTS

| | | | |
|---|---|---|---|
| JP | 08226470 | A | 9/1996 |
| JP | 11082570 | A | 3/1999 |
| JP | 3213191 | B2 | 10/2001 |
| JP | 2003139171 | A | 5/2003 |
| JP | 2003222171 | A | 8/2003 |
| TW | 396119 | B | 7/2000 |

OTHER PUBLICATIONS

1st Chinese Office Action, Application No. 201380006604.0, dated Apr. 12, 2016.

* cited by examiner

CLIP FOR USE IN A DISC BRAKE ASSEMBLY AND DISC BRAKE ASSEMBLY INCLUDING SUCH A CLIP

BACKGROUND OF THE INVENTION

This invention relates in general to vehicle disc brake assemblies and in particular to an improved structure for a brake clip for use in a brake pad assembly of a disc brake assembly and a disc brake assembly including such a brake clip.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a brake rotor which is secured to a wheel of the vehicle for rotation therewith. The disc brake assembly further includes a caliper assembly that is slidably supported on pins secured to an anchor bracket. The anchor bracket is secured to a non-rotatable component of the vehicle, such as the axle flange or steering knuckle, which is connected to the vehicle frame. The caliper assembly includes a pair of brake pads which are disposed on opposite sides of the brake rotor. The brake pads are connected to one or more hydraulically or pneumatically actuated pistons for movement between a non-braking position and a braking position, wherein they are moved into frictional engagement with the opposed braking surfaces of the brake rotor. For example, when an operator of the vehicle depresses the brake pedal, the piston urges the brake pads from the non-braking position to the braking position so as to frictionally engage the opposed braking surfaces of the brake rotor and thereby slow or stop rotation of the associated wheel of the vehicle.

When the disc brake assembly is not actuated, the brake pads are normally spaced apart from the opposite sides of the rotor. Because they are not positively engaged with the rotor, the brake pads are free to move relative to other brake and vehicle components during vehicle operation. As a result, vehicle induced vibration loads are known to cause undesirable rattle or other noises between the brake pads and the other brake components. To prevent this from occurring, it is known to provide a brake clip between the anchor bracket and the brake pad.

A typical brake clip is embodied as a spring metal member having outwardly extending legs or walls which spring load each of the brake pads against a non-moving component of the disc brake assembly. The brake clip exerts a relatively small force against the associated brake pad which prevents it from rattling while limiting pad sliding resistance to an optimum level when the disc brake assembly is disengaged. However, it is known for debris (e.g. brake dust, corrosion, etc.) to accumulate between the brake clip and the anchor bracket. Over time, the debris can become packed and harden thereby compromising a predefined clearance between the brake pad and the brake clip which may, in turn, cause the brake pads to seize. Thus, it would be desirable to provide a brake clip that eliminates or substantially reduces rattle noise and the accumulation of debris between the brake clip and the anchor bracket.

SUMMARY OF THE INVENTION

This invention relates to a brake clip for use in a brake pad assembly of a disc brake assembly and a disc brake assembly including such a brake clip. According to one embodiment of the present invention, a brake clip is provided for use with a disc brake assembly. The brake clip includes a U-shaped section having a base leg with opposing first and second legs extending from the base leg. An abutment leg extends from at least one of the first and second legs of the U-shaped section. An extension leg extends from the abutment leg. The abutment leg is in contact with an anchor bracket of the disc brake assembly and the extension leg is in contact with a brake pad of the disc brake assembly when the brake clip is disposed therebetween.

According to another embodiment of the present invention, the brake clip is provided wherein the abutment leg extends generally perpendicular from at least one of the first and second legs of the U-shaped section.

According to another embodiment of the present invention, the brake clip is provided wherein at least one of the first and second legs of the U-shaped section includes a retention tab extending outwardly from a surface thereof.

According to another embodiment of the present invention, the brake clip is provided wherein at least one of the abutment leg and the extension leg is adapted to be deflected from an initial position to a second position by the brake pad when the brake clip is disposed between the anchor bracket and the brake pad.

According to another embodiment of the present invention, the brake clip further includes a first support leg extending from one of the first and second legs of the U-shaped section, and a second support leg extending from the first support leg so as to overlap with the first and second legs.

According to another embodiment of the present invention, the brake clip further includes a retractor clip extending along one of the first and second legs of the U-shaped section.

According to another embodiment of the present invention, a brake pad and clip assembly for use with a disc brake assembly is provided that includes a brake pad having at least one guide rail. At least one brake clip that is adapted to be disposed between the guide rail of the brake pad and an anchor bracket of the disc brake assembly. The brake clip includes a U-shaped section having a base leg with opposing first and second legs extending from the base leg. An abutment leg extends from at least one of the first and second legs of the U-shaped section. An extension leg extends from the abutment leg, wherein the abutment leg is in contact with the anchor bracket and the extension leg is in contact with the brake pad when the brake clip is disposed therebetween.

According to another embodiment of the present invention, the brake pad and clip assembly is provided wherein the brake pad further includes an abutment surface in contact with the abutment leg of the brake clip when the brake clip is disposed between the brake pad and the anchor bracket.

According to another embodiment of the present invention, the brake pad and clip assembly is provided wherein the abutment surface includes one of a chamfer and a relief for reducing the contact area between the abutment surface and the abutment leg of the brake clip.

According to another embodiment of the present invention, the brake pad and clip assembly is provided wherein the guide rail of the brake pad includes at least two protrusions that are spaced apart from one another and in contact with the U-shaped section of the brake clip when the brake clip is disposed between the brake pad and the anchor bracket.

According to another embodiment of the present invention, the brake pad and clip assembly is provided wherein the brake pad includes a surface that is angled relative to at least one of the first and second legs of the U-shaped section of the brake clip. The extension leg of the brake clip is in contact with the angled surface when the brake clip is disposed between the anchor bracket and the brake pad.

According to another embodiment of the present invention, a disc brake assembly is provided that includes an anchor bracket having a channel formed therein that includes a rear surface and opposing first and second surfaces extending from the rear surface. The anchor bracket further includes a contact surface extending from at least one of the first and second surfaces of the channel. A brake pad includes a guide rail that is disposed within the channel of the anchor bracket. A brake clip is disposed between the anchor bracket and the brake pad. The brake clip includes a U-shaped section having a base leg with opposing first and second legs extending from the base leg. An abutment leg extends from at least one of the first and second legs of the U-shaped section, wherein the abutment leg is in contact with the contact surface of the anchor bracket. An extension leg extends from the abutment leg, wherein the extension leg is in contact with a portion of the brake pad.

According to another embodiment of the present invention, the disc brake assembly is provided wherein the contact surface of the anchor bracket extends generally perpendicular from at least one of the first and second surfaces of the channel.

According to another embodiment of the present invention, the disc brake assembly is provided wherein the brake pad further includes an abutment surface in contact with the abutment leg of the brake clip.

According to another embodiment of the present invention, the disc brake assembly is provided wherein at least one of the abutment leg and the extension leg of the brake clip is deflected from an initial position to a second position by the brake pad when the brake clip is disposed between the anchor bracket and the brake pad.

According to another embodiment of the present invention, the disc brake assembly is provided wherein at least one of the first and second surfaces of the channel in the anchor bracket includes a groove, and at least one of the first and second legs of the U-shaped section of the brake clip includes a retention tab that is received within the groove.

According to another embodiment of the present invention, the disc brake assembly is provided wherein the brake pad includes a surface that is angled relative to at least one of the first and second legs of the U-shaped section of the brake clip, and the extension leg of the brake clip is in contact with the angled surface.

According to another embodiment of the present invention, the disc brake assembly is provided wherein the anchor bracket includes a ledge having a front surface extending from one of the first and second surfaces and a top surface extending from the front surface. The brake clip further includes a first support leg extending from one of the first and second legs of the U-shaped section along the front surface of the ledge and a second support leg extending from the first support leg along a top surface of the ledge.

According to another embodiment of the present invention, the disc brake assembly is provided wherein the brake clip further includes a retractor clip extending along one of the first and second legs of the U-shaped section.

According to another embodiment of the present invention, a brake pad and clip assembly for use with a disc brake assembly is provided that includes a brake pad having a guide rail, wherein the guide rail includes at least two protrusions that are spaced apart from one another. A brake clip including a U-shaped section having a base leg with opposing first and second legs extends from the base, wherein the U-shaped section receives the guide rail of the brake pad therein such that the two protrusions of the guide rail are in contact with the U-shaped section of the brake clip when the brake pad and brake clip are assembled on the disc brake assembly.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
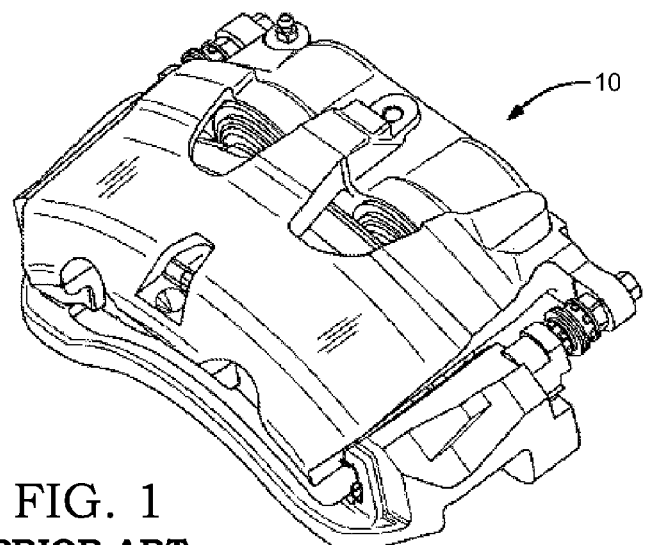
FIG. 1 is a perspective view of a prior art disc brake assembly.

Referring now to the drawings, there is illustrated in FIG. 1 a prior art disc brake assembly, indicated generally at 10, for applying braking friction to a braking rotor (not shown) of a vehicle (also not shown). The general structure and operation of the prior art disc brake assembly 10 is conventional in the art. Thus, only those portions of the prior art disc brake assembly 10 that are necessary for a full understanding of this invention will be explained and illustrated.

Figure 2:
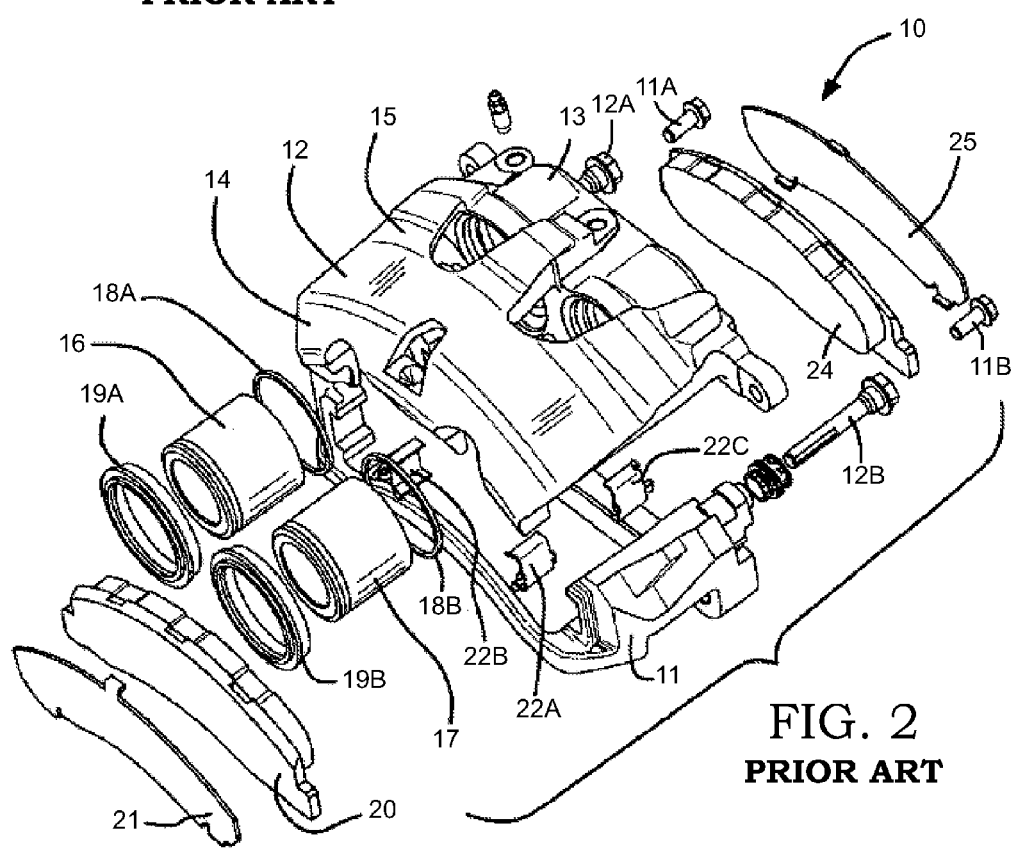
FIG. 2 is an exploded perspective view of the prior art disc brake assembly illustrated in FIG. 1.

FIG. 2 illustrates an exploded view of the prior art disc brake assembly 10. The prior art disc brake assembly 10 includes a caliper assembly which typically includes an anchor bracket 11 and a caliper 12. The caliper 12 is slidably supported to the anchor bracket 11 by a pair of pins 12A and 12B. The anchor bracket 11 is, in turn, secured to a stationary component of the vehicle, such as for example an axle flange (not shown) or a steering knuckle (also not shown) by a pair of mounting bolts 11A and 11B. The caliper 12 includes an inner section 13 and an outer section 14 connected by a bridge section 15. A pair of hydraulic actuators, namely a first piston 16 and a second piston 17 connect to hydraulic ports (not shown) of the inner section 13.

A first seal 18A and a second seal 18B are disposed between the first piston 16 and the second piston 17 and their respective hydraulic ports for creating a sealed surface between the hydraulic ports and first and second pistons 16 and 17. A first dust seal 19A and a second dust seal 19B are coupled to exposed ends of the first piston 16 and the second piston 17, respectively. The first dust seal 19A and the second dust seal 19B prevent dust and other contaminants from forming on the end portions of the first and second pistons 16 and 17.

An outer brake pad 20 and an outer noise insulator 21 are supported by the anchor bracket 11. A first clip 22A and a second clip 22B are adapted to mate with end portions of the outer brake pad 20. The first clip 22A and second clip 22B assist in retaining the outer brake pad 20 to the anchor bracket 11 in addition to preventing rattle of the outer brake pad 20.

An inner brake pad 24 and an inner noise insulator 25 are also supported by the anchor bracket 11. A third clip 22C and a fourth clip 22D (not shown) are adapted to mate with end portions of the inner brake pad 24. The third clip 22C and fourth clip 22D assist in retaining the inner brake pad 24 to the anchor plate 11 in addition to preventing rattle of the inner brake pad 24.

When pressurized fluid is forced against the first piston 16 and second piston 17, the inner brake pad 24 is urged against the brake rotor (not shown) for applying a friction force to the rotor. An inward force is also applied by the caliper 12 to the outer brake pad 20 for urging the outer brake pad 20 against the brake rotor for applying a friction force to the rotor.

Figure 3:
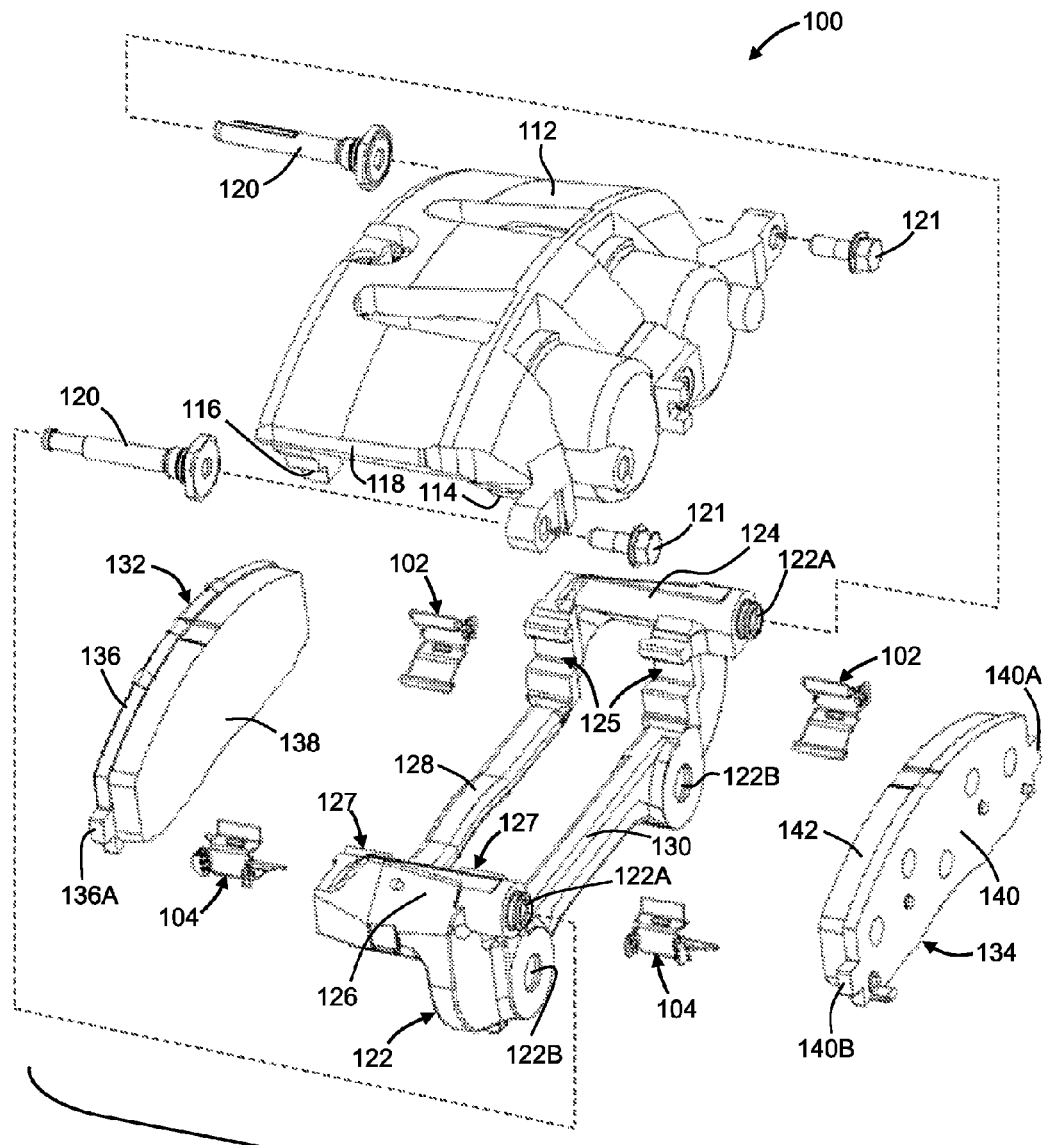
FIG. 3 is an exploded perspective view of selected components of a disc brake assembly including a plurality of brake clips in accordance with a first embodiment of the present invention.

Referring now to FIG. 3, there is illustrated a perspective view of selected components of a disc brake assembly, indicated generally at 100, including a first pair of brake clips 102 and a second pair of brake clips 104 shown in an uninstalled position thereon, in accordance with a first embodiment of the present invention. The disc brake assembly 100 that is illustrated in FIG. 3 is a well known "Collete" sliding type of disc brake assembly. The general structure and operation of the disc brake assembly 100 is conventional in the art. Thus, only those portions of the disc brake assembly 100 which are necessary for a full understanding of this invention will be explained and illustrated in detail. Also, although this invention will be described and illustrated in connection with the particular disc brake assembly 100 disclosed herein, it will be appreciated that this invention may be used in connection with other types of disc brake assemblies. For example, the invention may be used in conjunction with other single piston, twin piston, single opposed piston and twin opposed piston disc brake assemblies, such as shown for example in U.S. Pat. No. 7,784,591 to Franz et al., the disclosure of which is incorporated by reference in entirety herein.

As shown therein, the illustrated disc brake assembly 100 includes a generally C-shaped caliper 112, an anchor bracket 122, and a pair of brake pads 132 and 134. The disc brake assembly 100 is illustrated as being adapted for use on a front left wheel of a vehicle, although such is not required.

In this embodiment, the caliper 112 includes an inner section 114 and an outer section 116 that are connected by a bridge section 118. The illustrated caliper 112 is slidably supported to the anchor bracket 122 by a pair of guide pins 120 that extend into the anchor bracket 122. The caliper 112 can be secured to the guide pins 120 by a pair of guide pin bolts 121. The anchor bracket 122 is, in turn, secured to a stationary component of a vehicle, such as for example an axle flange (not shown) or a steering knuckle (also not shown).

In the illustrated embodiment, the anchor bracket 122 includes a first pair of spaced apart non-threaded openings or blind holes 122A, and a second pair of spaced apart threaded openings 122B. The openings 122A are each adapted to receive one of the associated guide pins 120, and the openings 122B are each adapted to receive a mounting bolt (not shown). The mounting bolts extend through the openings 122B and are received in threaded openings provided in the stationary vehicle component (not shown), thereby securing the anchor bracket 122 to the stationary vehicle component. Alternatively, other known securing methods can be used to secure the brake caliper 112 to the anchor bracket 122 and/or to secure the anchor bracket 122 to the stationary vehicle component if so desired.

In the illustrated embodiment, the anchor bracket 122 includes a pair of axially and outwardly extending arms 124 and 126 that are interconnected at their outboard ends by an outer tie bar 128 and interconnected at their inboard ends by an inner tie bar 130. In this embodiment, the arm 126 is at the leading end of the disc brake assembly 100 and the arm 124 is at the trailing end of the disc brake assembly 100. Alternatively, the anchor bracket 122 can be constructed to include only one of the inner tie bar 130 or the outer tie bar 128 if so desired.

Each of the arms 124 and 126 respectively includes a pair of spaced apart notches or channels, indicated generally at 125 and 127, formed therein (only channels 125 are clearly shown, but channels 127 are preferably identical to the channels 125). In particular, the pair of channels 125 are provided on the inner wall of arm 124 and are parallel to one another, and the pair of channels 127 are provided on the inner wall of arm 126 and are parallel to one another. The channels 125 and 127 slidably support the outboard brake pad 132 and the inboard brake pad 134 having the brake clips 102 and 104 assembled therewith, as will be explained below. Thus, in the illustrated embodiment the channels 125 and 127 are adapted to receive the associated brake clips 102 and 104 prior to assembly of the brake pads 132 and 134 to the anchor bracket 122. The channels 125 and 127 will be described in further detail below.

The outboard brake pad 132 includes a backing plate 136 and a friction pad 138. The outboard backing plate 136 includes opposite ends having outwardly projecting guide rails 136A (only one guide rail is shown) formed thereon. The guide rails 136A are configured to support the outboard brake pad 132 for sliding movement within the channels 125 and 127 of the anchor bracket 122. Similarly, the inboard brake pad 134 includes a backing plate 140 and a friction pad 142. The inboard backing plate 140 includes opposite ends having outwardly projecting guide rails 140A and 140B formed thereon. The guide rails 140A and 140B are configured to support the inboard brake pad 134 for sliding movement within the channels 125 and 127 of the anchor bracket 122. Alternatively, in another non-illustrated embodiment, the outboard brake pad 132 can be supported on a brake piston of the disc brake assembly 100 while the inboard brake pad 134 can be supported on the inboard leg portion 116 of the caliper 112. In the illustrated embodiment, the guide rails 136A and 140A, 140B each preferably have a generally rectangular cross sectional shape, although such is not required.

Figure 4:
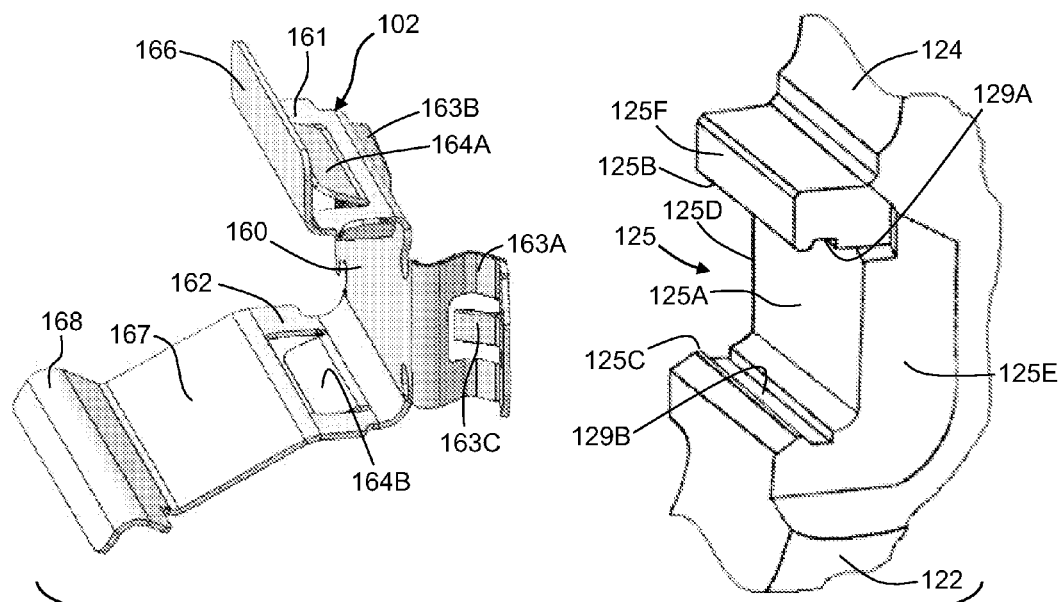
FIG. 4 is an exploded perspective view of one of the brake clips illustrated in FIG. 3 prior to installation on an anchor bracket which is partially illustrated therein.
Figure 5:
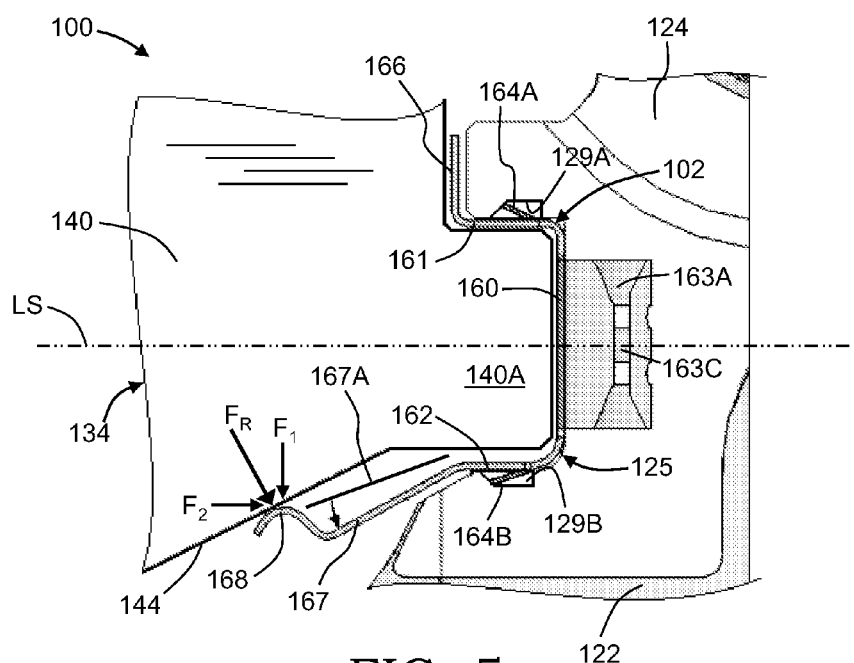
FIG. 5 is a side view of a portion of the disc brake assembly illustrated in FIG. 3 showing the brake clip illustrated in FIGS. 3 and 4 installed on the anchor bracket.

Referring now to FIGS. 4 and 5, the structure of the first embodiment of the channels 125 and 127 and the brake clips 102 and 104 will be described. It should be appreciated that the pairs of channels 125 and 127 can be identical to or mirror images of one another and, similarly, the pair of brake clips 102 and 104 can be identical to or mirror images of one another, although such is not required. Accordingly, only one of the channels 125 and 127, namely channel 125, and only one of the brake clips 102 and 104, namely brake clip 102, will be described below in connection with the embodiment shown in FIGS. 4 and 5.

As shown in the illustrated embodiment, the channel 125 has a generally rectangular cross section that includes a rear surface 125A and opposing upper and lower surfaces 125B and 125C. In particular, the upper and lower surfaces 125B and 125C are generally parallel with one another and extend outwardly in a perpendicular manner from the rear surface 125A, although the surfaces may have any angle relative to one another or the rear surface 125A. In addition, the illustrated anchor bracket 122 includes a first side surface 125D and a second side surface 125E that extend along opposite sides of the inner tie bar 130 thereof. The anchor bracket 122 further preferably includes a front surface 125F that extends upwardly from the upper surface 125B of the channel 125. The front surface 125F is a substantially flat surface that extends in a generally perpendicular direction from the upper surface 125B, although such is not required.

The channel 125 may further include a pair of opposing grooves 129A and 129B that are provided in the upper and lower surfaces 125B and 125C, respectively. As shown in FIG. 4, the grooves 129A and 129B extend along an entire length of the upper and lower surfaces 125B and 125C, although such is not required. Further, the grooves 129A and 129B can have any cross-sectional shape as desired. For example, as shown in FIG. 5, the grooves 129A and 129B may each define a trapezoidal shape having at least one surface that is angled or otherwise slanted, the purposes of which will be explained below.

Referring again to FIG. 4, the illustrated brake clip 102 includes a U-shaped section having a substantially flat base leg 160. A first or upper leg 161 and a second or lower leg 162 extend outwardly in a generally perpendicular manner from opposing edges of the base leg 160. The upper leg 161 and the lower leg 162 are flat structures that are parallel with one another and perpendicular with the base portion 160, thereby forming a rectangular shape that generally corresponds with the shape of the channel 125, although such is not required. As such, when the brake clip 102 is installed on the anchor bracket 122, the base leg 160 extends along and is seated against the rear surface 125A of the channel 125. The upper leg 161 extends along and is generally seated against or otherwise in contact with the upper surface 125B of the channel 125, although such is not required. The lower leg 162 extends along and is generally seated against or otherwise in contact with the lower surface 125C of the channel 125, although such is also not required.

In the illustrated embodiment, the brake clip 102 preferably includes at least one or a pair of retaining members 163A and 163B. The retaining members 163A and 163B are resilient portions that extend rearward from opposite edges of the base leg 160. It should be appreciated that the retention members 163A and 163B can be formed by a stamping operation or, alternatively, may be separate components that are secured thereto if so desired. Either or both of the retaining members 163A and 163B may include a lip, a protrusion, or any other structural features that are configured to engage the anchor bracket 122 and secure the brake clip 102 thereto. For example, the illustrated retaining member 163A includes a "punch-out" tab 163C. In operation, when the brake clip 102 is installed on the anchor bracket 122, the retaining members 163A and 163B extend along and engage the side surfaces 125D and 125E, respectively, of the anchor bracket 122 to assist in securing the brake clip 102 to the anchor bracket 122.

The illustrated upper leg 161 further includes a retention tab 164A and the illustrated lower leg 162 further includes a retention tab 164B, although either or both are not required. The retention tabs 164A and 164B are resilient members that extend outwardly from surfaces of the upper and lower legs 161 and 162, respectively. For example, the retention tab 164A may extend upwardly from the upper leg 161 and the retention tab 164B may extend downwardly from the lower leg 162. As shown, the retention tabs 164A and 164B are elongated, rectangular shaped tabs that are respectively attached along one side thereof to the upper and lower legs 161 and 162. It should be appreciated that the retention tabs 164A and 164B can be formed by a punching or stamping operation or, alternatively, may be separate components that are secured thereto if so desired. In operation, when the brake clip 102 is installed on the anchor bracket 122, the retention tabs 164A and 164B extend into the grooves 129A and 129B, respectively, which are formed in the upper and lower surfaces 125B and 125C of the channel 125. End portions of the retention tabs 164A and 164B engage the slanted surface of the respective grooves 129A and 129B to positively secure the brake clip 102 to the anchor bracket 122. Thus, the retention tabs 164A and 164B are configured to prevent or substantially reduce movement of the brake clip 102 relative to the channel 125 during operation of the disc brake assembly 100. Additional embodiments of the retention tabs 164A and 164B will be described below.

In the illustrated embodiment, the upper leg 161 of the brake clip 102 further preferably includes a first support leg 166. The first support leg 166 extends from the upper leg 161. As shown in FIG. 5, the first support leg 166 is configured to generally correspond with and extend adjacent to the front surface 125F of the anchor bracket 122 when the brake clip 102 is installed on the anchor bracket 122, although such is not required. As such, the first support leg 166 is disposed between the anchor bracket 122 and the backing plate 140 of the brake pad 134 when the associated components of the disc brake assembly 100 are assembled. Further, the first support leg 166 can be seated against or otherwise contact the front surface 125F of the anchor bracket 122 if so desired to help reduce the intake and accumulation of debris behind the brake clip 102.

In the illustrated embodiment, the lower leg 162 of the brake clip 102 further preferably includes an extension leg 167. The extension leg 167 is a resilient member that extends outwardly from the lower leg 162 and has an initial angle relative to the lower leg 162, as indicated by line 167A. An end portion of the extension leg 167 may include a lip portion 168 having a semi-circular cross-sectional shape or any other desired cross-sectional shape. The lip portion 168 is provided to assist in deflection of the extension leg 167, as will be explained below.

In operation, when the brake pad 134 is installed on the anchor bracket 122 as shown in FIG. 5, the lip portion 168 of the extension leg 167 is preferably in contact with a lower angled surface 144 of the backing plate 140. The lower angled surface 144 can define any angular relationship relative to a line of symmetry LS that extends generally parallel with the upper and lower surfaces 125B and 125C of the channel 125. The extension leg 167 is deflected or otherwise pivoted by the lower angled surface 144 from an initial position 167A to a second position as illustrated. A resultant spring force $F_R$ is generated in the extension leg 167 due to the material (e.g. spring steel) that is used to form the brake clip 102. As a result of the lower angled surface 144, the resultant force $F_R$ produces a first component force $F_1$ and a second component force $F_2$. The first component force $F_1$ acts in a vertical direction, respectively, and helps maintain contact pressure between the lower leg 162 of the brake clip 102 and the lower surface 125C of the channel 125. The second component force $F_2$ acts in a horizontal direction, respectively, and helps the brake clip 102 to "self jam" against the rear surface 125A of the channel 125. Thus, contact of the extension leg 167 with the lower angled surface 144 helps to prevent the intake and accumulation of debris between the brake clip 102 and the anchor bracket 122.

To assemble the illustrated brake clip 102 to the anchor bracket 122, the first retaining member 163B can be initially brought into contact with the side surface 125D of the anchor bracket 122. The brake clip 102 can then be rotated or moved until the second retaining member 163A subsequently contacts the opposite side surface 125E of the anchor bracket 122. As discussed above, once the brake clip 102 is installed, the retention tabs 164A and 164B are seated in the upper and lower grooves 129A and 129B, respectively, such that the brake clip 102 is positively secured to the anchor bracket 122. Alternatively, the construction and/or the configuration of one or more of the channels 125 and/or 127 and/or one or more of the brake clips 102 and/or 104 can be other than illustrated and described if so desired. Also, it should be appreciated that the brake clip 102 can be assembled and thereby secured to the anchor bracket 122 in any desirable manner.

Figure 6:
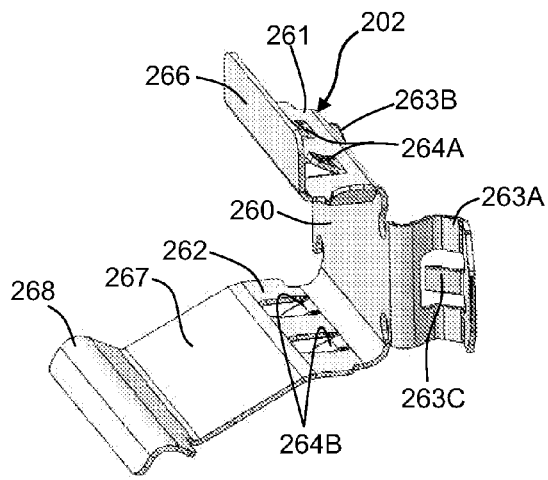
FIG. 6 is a perspective view of a brake clip in accordance with a second embodiment of the present invention.

Referring now to FIG. 6, there is illustrated a brake clip, indicated generally at 202, in accordance with a second embodiment of the present invention. The brake clip 202 may include any structural features as described and illustrated above in the first embodiment, although such is not required. Similar features have been numbered with common reference numerals but have been increased to 200 (e.g. 202, 222, 232, etc.). It should be appreciated that similar features are structured similarly, operate similarly, and/or have the same function unless otherwise indicated by the drawings or this specification.

For example, the illustrated brake clip 202 includes a base leg 260, upper and lower legs 261 and 262, a pair of retaining members 263A and 263B, a plurality of retention tabs 264A and 264B, a first support leg 266, and an extension leg 267. However, in this embodiment the upper leg 261 includes a pair of generally square shaped retention tabs 264A that extends upwardly therefrom. As shown, the retention tabs 264A are laterally spaced apart from one another and inwardly spaced from edges of the upper leg 261. Similarly, in this embodiment the lower leg 262 also includes a pair of generally square shaped retention tabs 264B that extends downwardly therefrom. As shown, the retention tabs 264B are also laterally spaced apart from one another and inwardly spaced from edges of the lower leg 262. It should be appreciated that the retention tabs 264A and 264B can have any size or may be configured in any manner.

Figure 7:
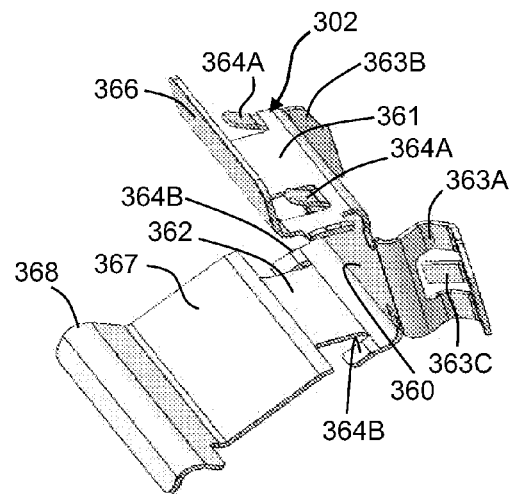
FIG. 7 is a perspective view of a brake clip in accordance with a third embodiment of the present invention.

Referring now to FIG. 7, there is illustrated a brake clip, indicated generally at 302, in accordance with a third embodiment of the present invention. The brake clip 302 may include any structural features as described and illustrated above in the previous embodiments, although such is not required. Similar features have been numbered with common reference numerals but have been increased to 300 (e.g. 302, 322, 332, etc.). It should be appreciated that similar features are structured similarly, operate similarly, and/or have the same function unless otherwise indicated by the drawings or this specification.

For example, the illustrated brake clip 302 includes a base leg 360, upper and lower legs 361 and 362, a pair of retaining members 363A and 363B, a plurality of retention tabs 364A and 364B, a first support leg 366, and an extension leg 367. However, in this embodiment the upper leg 361 includes a pair of generally square shaped retention tabs 364A that extends downwardly therefrom. As shown, the retention tabs 364A are laterally spaced apart from one another, but one of the retention tabs 364A is adjacent to an edge of the upper leg 361 and the other retention tab 364A is inwardly spaced from an opposite edge of the upper leg 361. Similarly, in this embodiment the lower leg 362 also includes a pair of generally square shaped retention tabs 364B that extends downwardly therefrom. As shown, the retention tabs 364B are laterally spaced apart from one another, but both of the retention tabs 364B are located adjacent to opposite edges of the lower leg 362. Thus, it should be appreciated that the retention tabs 364A and 364B can have any size or may be configured in any manner.

Figure 8:
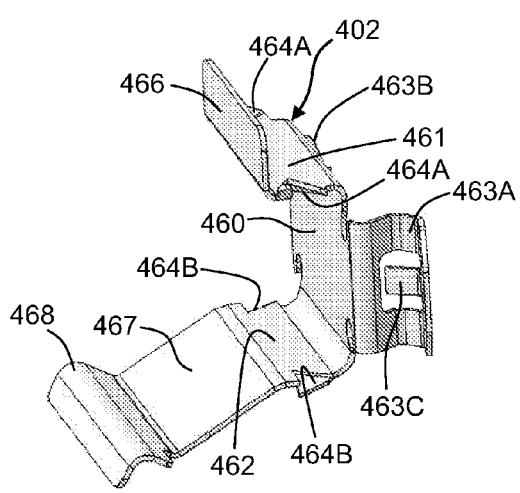
FIG. 8 is a perspective view of a brake clip in accordance with a fourth embodiment of the present invention.

Referring now to FIG. 8, there is illustrated a brake clip, indicated generally at 402, in accordance with a fourth embodiment of the present invention. The brake clip 402 may include any structural features as described and illustrated above in the previous embodiments, although such is not required. Similar features have been numbered with common reference numerals but have been increased to 400 (e.g. 402, 422, 432, etc.). It should be appreciated that similar features are structured similarly, operate similarly, and/or have the same function unless otherwise indicated by the drawings or this specification.

For example, the illustrated brake clip 402 includes a base leg 460, upper and lower legs 461 and 462, a pair of retaining members 463A and 463B, a plurality of retention tabs 464A and 464B, a first support leg 466, and an extension leg 467. However, in this embodiment the upper leg 461 includes a pair of generally triangular shaped retention tabs 464A that extends upwardly therefrom. As shown, the retention tabs 464A are laterally spaced apart from one another and are defined by edges of the upper leg 461 that are punched or otherwise bent upwardly. Similarly, in this embodiment the lower leg 462 also includes a pair of generally triangular shaped retention tabs 464B that extends downwardly therefrom. As shown, the retention tabs 464B are also laterally spaced apart from one another and are defined by edges of the lower leg 462 that are punched or otherwise bent downwardly. It should be appreciated that the retention tabs 464A and 464B can have any size or may be configured in any manner.

Figure 9:
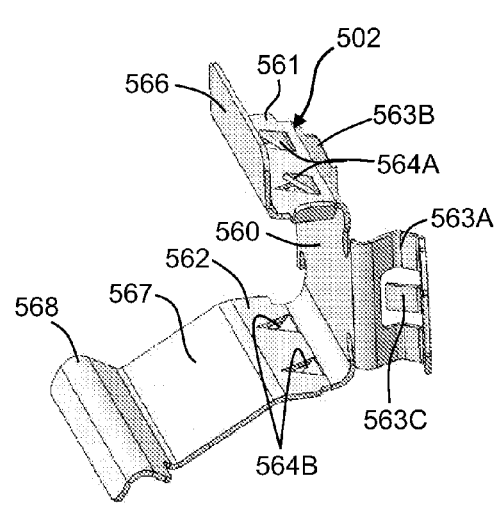
FIG. 9 is a perspective view of a brake clip in accordance with a fifth embodiment of the present invention.

Referring now to FIG. 9, there is illustrated a brake clip, indicated generally at 502, in accordance with a fifth embodiment of the present invention. The brake clip 502 may include any structural features as described and illustrated above in the previous embodiments, although such is not required. Similar features have been numbered with common reference numerals but have been increased to 500 (e.g. 502, 522, 532, etc.). It should be appreciated that similar features are structured similarly, operate similarly, and/or have the same function unless otherwise indicated by the drawings or this specification.

For example, the illustrated brake clip 502 includes a base leg 560, upper and lower legs 561 and 562, a pair of retaining members 563A and 563B, a plurality of retention tabs 564A and 564B, a first support leg 566, and an extension leg 567. However, in this embodiment the upper leg 561 includes a pair of generally triangular shaped retention tabs 564A that extends upwardly therefrom. As shown, the retention tabs 564A are laterally spaced apart from one another and inwardly spaced from edges of the upper leg 561. Similarly, in this embodiment the lower leg 562 also includes a pair of generally triangular shaped retention tabs 564B that extends downwardly therefrom. As shown, the retention tabs 564B are also laterally spaced apart from one another and inwardly spaced from edges of the lower leg 562. Thus, it should be appreciated that the retention tabs 564A and 564B can have any size or may be configured in any manner.

Figure 10:
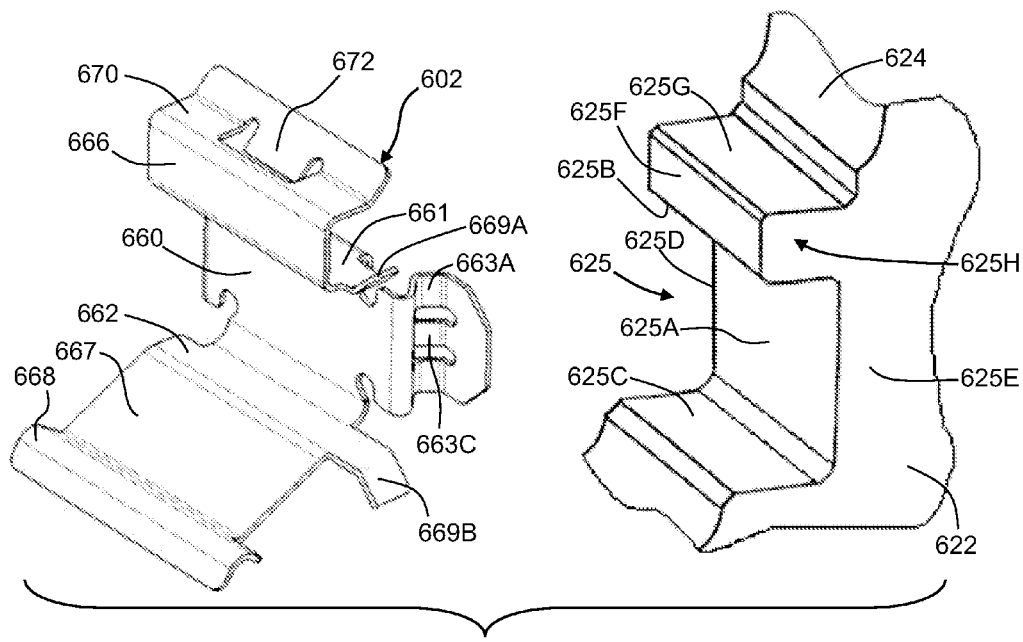
FIG. 10 is an exploded perspective view of a brake clip in accordance with a sixth embodiment of the present invention prior to installation on an anchor bracket which is partially illustrated therein.
Figure 11:
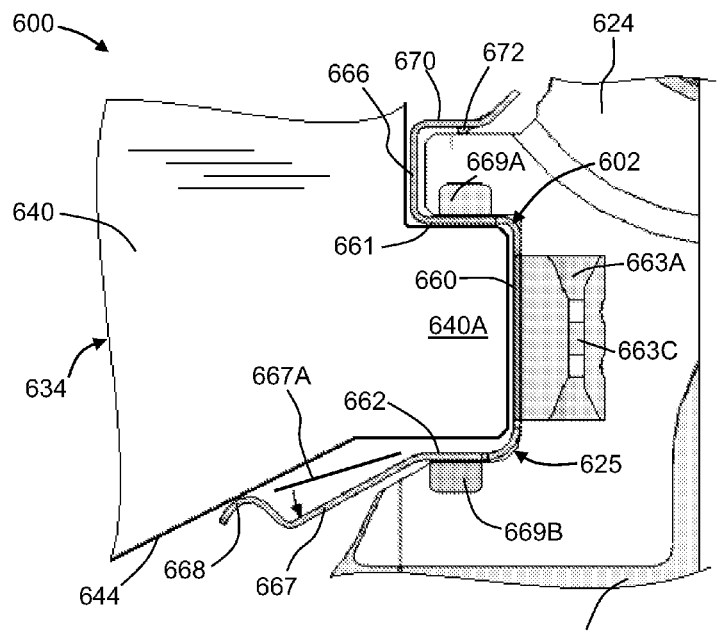
FIG. 11 is a side view of a portion of a disc brake assembly showing the brake clip illustrated in FIG. 10 installed on an anchor bracket.

Referring now to FIGS. 10 and 11, there is illustrated a brake clip 602 and an anchor bracket 622 including a channel, indicated generally at 625, in accordance with a sixth embodiment of the present invention. The brake clip 602 and the anchor bracket 622 may include any structural features as described and illustrated above in the previous embodiments, although such is not required. Similar features have been numbered with common reference numerals but have been increased to 600 (e.g. 602, 622, 632, etc.). It should be appreciated that similar features are structured similarly, operate similarly, and/or have the same function unless otherwise indicated by the drawings or this specification.

For example, the illustrated anchor bracket 622 includes a channel 625 having a rear surface 625A, upper and lower surfaces 625B and 625C, opposite side surfaces 625D and 625E, and a front surface 625F. The anchor bracket 622 further preferably includes a top surface 625G that extends rearward from the front surface 625F. Thus, the front surface 625F and the top surface 625G forms an upper ledge, indicated generally at 625H, that extends outwardly above the channel 625. In the illustrated embodiment, the top surface 625G defines a substantially flat surface that extends in a generally perpendicular manner from the front surface 625F. The front surface 625F and the top surface 625G may, however, define any angular relationship relative to the channel 625 as desired. The front surface 625F and the top surface 625G can be formed in any manner, including but not limited to a molding process, a machining process, a broaching process, or the like.

The illustrated brake clip 602 includes a base leg 660, upper and lower legs 661 and 662, a pair of retaining members 663A and 663B (not shown), a first support leg 666, and an extension leg 667. The brake clip 602 further preferably includes an upper installation tab 669A and a lower installation tab 669B, although such are not required. In this embodiment, the upper installation tab 669A extends outwardly from a side of the upper leg 661 and is angled upwardly therefrom. The lower installation tab 669B also extends outwardly from the lower leg 662 and is angled downwardly therefrom. The upper and lower installation tabs 669A and 669B are configured to align a guide rail 640A that is provided on a backing plate 640 for insertion into the channel 625 during installation of a brake pad 634 on the anchor bracket 622. It should be appreciated that the upper and lower installation tabs 669A and 669B can be otherwise configured in any suitable manner.

The upper leg 661 of the brake clip 602 further preferably includes a second support leg 670. The second support leg 670 extends rearward from the first support leg 666. As shown in FIG. 11, the second support leg 670 can be configured to extend along the top surface 625G of the upper ledge 625H. Thus, the second support leg 670 can extend generally perpendicular from the first support leg 666 and may be seated against the top surface 625G, although such is not required. The second support leg 670 may, however, define any angular relationship relative to the first support leg 666 or the top surface 625G of the upper ledge 625H as desired.

The second support leg 670 may further include a retention tab 672. The illustrated retention tab 672 extends downward from the second support leg 670 and in a forward direction toward the first support leg 666. Thus, when the brake clip 602 is installed on the anchor bracket 622, the retention tab 672 engages the top surface 625G of the upper ledge 625H at a location that is offset or otherwise spaced from the rear surface 625A of the channel 625 toward the front surface 625F. This configuration resists pivotal movement of the brake clip 602 away from the channel 625. Thus, it should be appreciated that the top surface 625G of the upper ledge 625H need not include a groove or the like to receive the retention tab 672 as a result of the offset engagement location. The retention tab 672 can be any structure, including but not limited to the retention tabs described and illustrated above in the previous embodiments.

Figure 12:
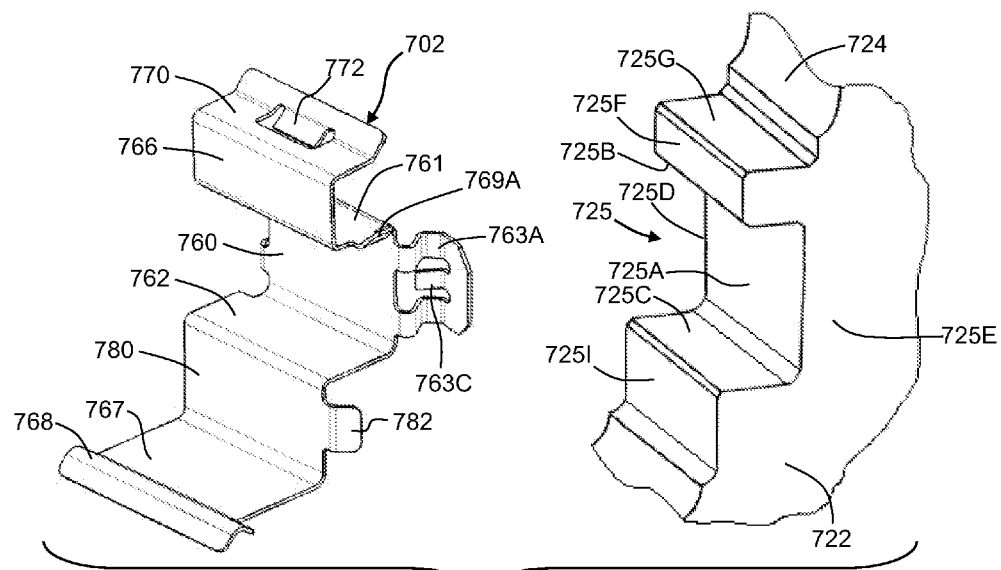
FIG. 12 is an exploded perspective view of a brake clip in accordance with a seventh embodiment of the present invention prior to installation on an anchor bracket which is partially illustrated therein.
Figures 13, 14:
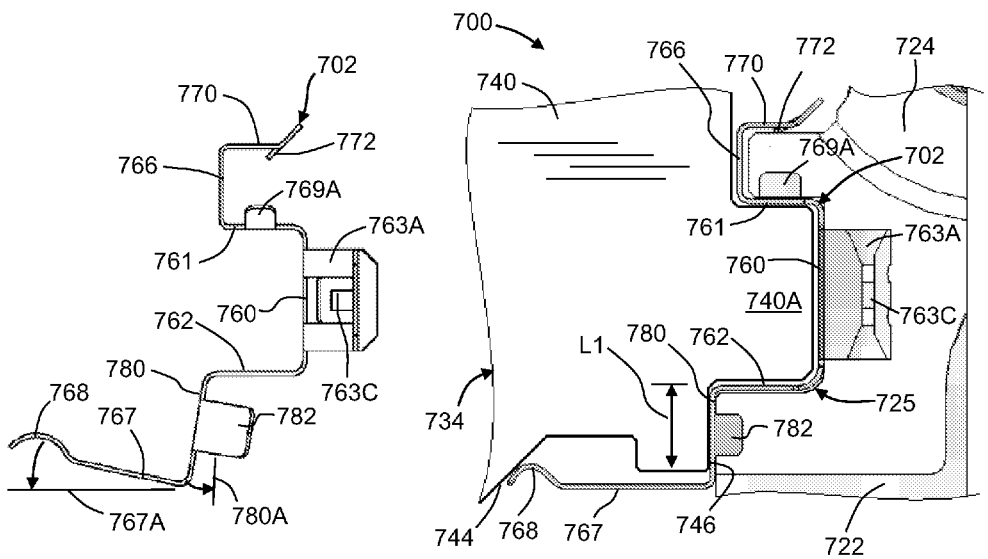
FIG. 13 is a side elevational view of the brake clip illustrated in FIG. 12 showing the brake clip in an uninstalled position.
FIG. 14 is a side view of a portion of a disc brake assembly showing the brake clip illustrated in FIGS. 12 and 13 installed on an anchor bracket.

Referring now to FIGS. 12 through 14, there is illustrated a brake clip 702 and an anchor bracket 722 including a channel, indicated generally at 725, in accordance with a seventh embodiment of the present invention. The brake clip 702 and the anchor bracket 722 may include any structural features as described and illustrated above in the previous embodiments, although such is not required. Similar features have been numbered with common reference numerals but have been increased to 700 (e.g. 702, 722, 732, etc.). It should be appreciated that similar features are structured similarly, operate similarly, and/or have the same function unless otherwise indicated by the drawings or this specification.

For example, the illustrated anchor bracket 722 includes a channel 725 having a rear surface 725A, upper and lower surfaces 725B and 725C, opposite side surfaces 725D and 725E, a front surface 725F, and a top surface 725G. The anchor bracket 722 further preferably includes a lower contact surface 7251 that extends downwardly from the lower surface 725C of the channel 725. In the illustrated embodiment, the lower contact surface 7251 defines a substantially flat surface that extends in a generally perpendicular manner from the lower surface 725C. The lower contact surface 7251 may, however, define any angular relationship relative to the lower surface 725C of the channel 725 as desired. It should also be appreciated that the lower contact surface 7251 can be formed in any manner, including but not limited to a molding process, a machining process, a broaching process, or the like.

The illustrated brake clip 702 includes a base leg 760, upper and lower legs 761 and 762, a pair of retaining members 763A and 763B (not shown), a first support leg 766, a second support leg 770, and an extension leg 767. The lower leg 762 of the brake clip 702 further preferably includes a lower abutment leg 780. The lower abutment leg 780 can be a resilient member that extends downwardly in a generally perpendicular manner from the lower leg 762, although such a configuration is not required. Thus, when the brake clip 702 is installed on an anchor bracket 722 as shown in FIG. 14, the lower abutment leg 780 extends adjacent the lower contact surface 7251 of the anchor bracket 722 and is preferably in contact with at least a portion of the lower contact surface 7251, as will be explained below. The extension leg 767, in turn, extends from the lower abutment leg 780.

As best shown in FIG. 13, the lower abutment leg 780 and the extension leg 767 are resilient members that are deflectable relative to the lower leg 762, the purpose of which will be explained below. The lower abutment leg 780 and the extension leg 767 may, however, be formed to initially define any desired angle relative to the lower leg 762 of the brake clip 702.

As shown in FIG. 14, a backing plate 740 of a brake pad 734 further includes a lower abutment surface 746. The lower abutment surface 746 extends downwardly from or is otherwise located adjacent a guide rail 740A that is provided on the backing plate 740. The lower abutment surface 746 is configured to generally correspond with and may contact the lower abutment leg 780 of the brake clip 702, although such is not required. Further, the lower abutment surface 746 can have a length L1, the purpose of which will be explained below. It should be appreciated that the lower abutment surface 746 can be formed in any manner, including but not limited to a molding process, a machining process, a broaching process, or the like.

In operation, when the brake pad 734 is installed on an anchor bracket 722 as shown in FIG. 14, a lip portion 768 of the extension leg 767 is preferably in contact with a lower angled surface 744 of the backing plate 740. The lower angled surface 744 can define any angular relationship relative to a line of symmetry that extends generally parallel with the upper and lower surfaces 725B and 725C of the channel 725 (see FIG. 5). The extension leg 767 is deflected or otherwise pivoted by the lower angled surface 744 from an initial position 767A to a second position as illustrated. A resultant spring force $F_R$ (see FIG. 5) is generated in the extension leg 767 due to the material (e.g. spring steel) that is used to form the brake clip 702. As described above, the resultant force $F_R$ acts against the lower angled surface 744 and produces a first component force $F_1$ and a second component force $F_2$ (see FIG. 5). The first component force $F_1$ acts in a vertical direction, respectively, and helps maintain contact pressure between the upper leg 761 of the brake clip 702 and the upper surface 725B of the channel 725. The second component force $F_2$ acts in a horizontal direction, respectively, and helps to maintain contact pressure between the lower abutment leg 780 and at least a portion of the lower contact surface 7251. Thus, contact of the extension leg 767 with the lower angled surface 744 helps to prevent the intake and accumulation of debris between the brake clip 702 and the anchor bracket 722. Further, the lower abutment surface 746 of the backing plate 740 may also contact the lower abutment leg 780 and deflect or otherwise pivot the lower abutment leg 780 from an initial position 780A to a second position as illustrated, although such is not required. This configuration helps to maintain contact pressure between the lower abutment leg 780 and at least a portion of the lower contact surface 7251. It should also be appreciated that the lower abutment leg 780 may be angled relative to the lower contact surface 7251 (i.e. define a partial clearance therebetween) in the second position such that the brake clip 702 can "self jam" against the rear surface 725A of the channel 725 when either the lower abutment leg 780 or the extension leg 767 is engaged by the backing plate 740.

In the illustrated embodiment, the lower abutment leg 780 further preferably includes a retention member 782 provided on an outboard side thereof, although such is not required. The illustrated retention member 782 is a resilient projection that extends from the lower abutment leg 780 in a rearward direction along a side surface 725E of the anchor bracket 722. The retention member 782 opposes a retraction load that is created by retraction of the backing plate 740 relative to the anchor bracket 722. Thus, the retention member 782 prevents the backing plate 740 from pulling the brake clip 702 toward a rotor (not shown) as the friction material of the brake pad 734 wears from use. Further, the retention member 782 may assist in alignment of the lower abutment leg 780 on the lower contact surface 7251 of the anchor bracket 722 when the brake clip 702 is installed thereon. It should be appreciated that the retention member 782 may include a lip, a protrusion, a tab, or any other structural feature that is configured to contact the side surface 725E of the anchor bracket 722 if so desired.

It should be fully appreciated that the brake clip 702 may include any combination of elements described above. In one example, the brake clip 702 may include at least the base leg 760, the upper and lower legs 761 and 762, the lower abutment leg 780, and the extension leg 767. In this example, the brake clip 702 may also include the first support leg 766 if desired. The brake clip 702 may further include the second support leg 770 if desired. Thus, the brake clip 702 is not limited to the illustrated embodiment.

Figure 14A:
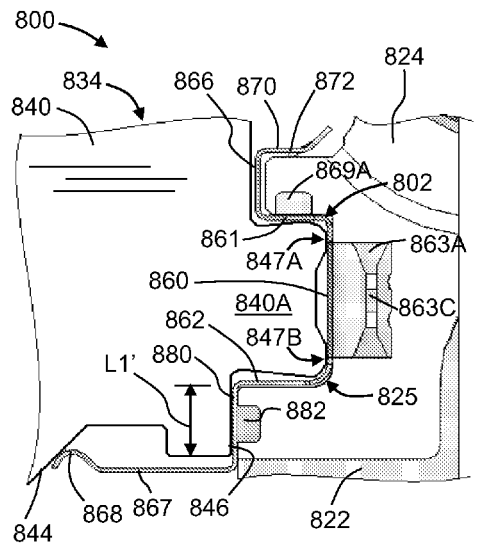
FIG. 14A is a side view of a portion of a disc brake assembly showing the brake clip illustrated in FIGS. 12 and 13 installed on an anchor bracket in accordance with an eighth embodiment of the present invention.

Referring now to FIG. 14A, there is illustrated a disc brake assembly, indicated generally at 800, in accordance with an eighth embodiment of the present invention. The illustrated disc brake assembly 800 includes a brake clip 802, an anchor bracket 822, and a brake pad 834. The brake clip 802, the anchor bracket 822, and the brake pad 834 may include any structural features as described and illustrated above in the previous embodiments, although such is not required. Similar features have been numbered with common reference numerals but have been increased to 800 (e.g. 802, 822, 832, 842, etc.). It should be appreciated that similar features are structured similarly, operate similarly, and/or have the same function unless otherwise indicated by the drawings or this specification.

For example, the illustrated brake clip 802 includes a base leg 860, upper and lower legs 861 and 862, a pair of retaining members 863A and 863B (not shown), a first support leg 866, a second support leg 870, a lower abutment leg 880, and an extension leg 867. It should be appreciated, however, that the brake clip 802 may include any structural features as desired.

The illustrated brake pad 834 includes a backing plate 840. As shown, the backing plate 840 includes an outwardly projecting guide rail 840A formed thereon. The guide rail 840A is configured to support the brake pad 834 for sliding movement within a channel 825 of the anchor bracket 822. The brake pad 834 further includes a lower abutment surface 846, although such is not required. The lower abutment surface 846 extends downwardly from or is otherwise located adjacent the guide rail 840A. The lower abutment surface 846 may be configured to generally correspond with the lower abutment leg 880 of the brake clip 802, as described above in the previous embodiment.

In the illustrated embodiment, the guide rail 840A includes two protrusions 847A and 847B that are spaced apart from one another. As such, when the brake pad 834 and the brake clip 802 are assembled to the anchor bracket 822, the protrusions 847A and 847B engage the base leg 860 of the brake clip 802 at two discrete locations, thereby forming a space between the respective protrusions 847A and 847B. Such a configuration creates contact pressure at the discrete locations, which facilitates a reduction in debris that is allowed to enter between the guide rail 840A, the brake clip 802, and the anchor bracket 822. In the event that debris does enter between the guide rail 840A, the brake clip 802, or the anchor bracket 822, the high contact engagement pressure of the protrusions 847A and 847B with the brake clip 802 is configured to fragment such debris for removal thereof. It should be appreciated that the protrusions 847A and 847B can be included on any other portion of the brake clip 802 as desired. Further, the protrusions 847A and 847B can be included with any other embodiment disclosed in the present invention.

Figure 14B:
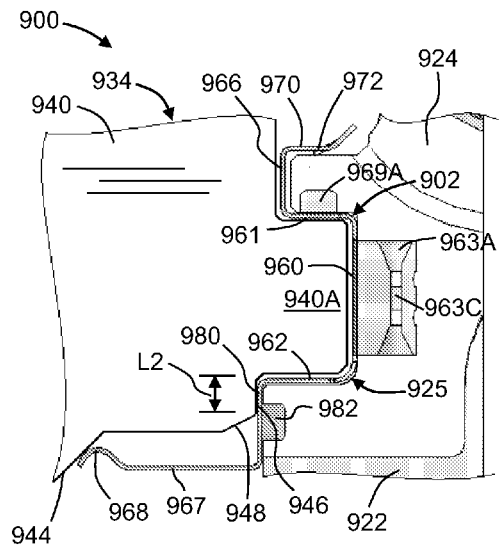
FIG. 14B is a side view of a portion of a disc brake assembly showing the brake clip illustrated in FIGS. 12 and 13 installed on an anchor bracket in accordance with a ninth embodiment of the present invention.

Referring now to FIG. 14B, there is illustrated a disc brake assembly, indicated generally at 900, in accordance with a ninth embodiment of the present invention. The illustrated disc brake assembly 900 includes a brake clip 902, an anchor bracket 922, and a brake pad 934. The brake clip 902, the anchor bracket 922, and the brake pad 934 may include any structural features as described and illustrated above in the previous embodiments, although such is not required. Similar features have been numbered with common reference numerals but have been increased to 900 (e.g. 902, 922, 932, 942, etc.). It should be appreciated that similar features are structured similarly, operate similarly, and/or have the same function unless otherwise indicated by the drawings or this specification.

For example, the illustrated brake clip 902 includes a base leg 960, upper and lower legs 961 and 962, a pair of retaining members 963A and 963B (not shown), a first support leg 966, a second support leg 970, a lower abutment leg 980, and an extension leg 967. It should be appreciated, however, that the brake clip 902 may include any desired structural features.

The illustrated brake pad 934 includes a backing plate 940. As shown, the backing plate 940 includes an outwardly projecting guide rail 940A formed thereon. The guide rail 940A is configured to support the brake pad 934 for sliding movement within a channel 925 of the anchor bracket 922. The brake pad 934 further includes a lower abutment surface 946. The lower abutment surface 946 extends downwardly from or is otherwise located adjacent the guide rail 940A. The lower abutment surface 946 may be configured to generally correspond with the lower abutment leg 980 of the brake clip 902, although such is not required.

In the illustrated embodiment, the lower abutment surface 946 of the backing plate 940 has a reduced length L2 as compared to the length L1 described above in FIG. 14. The reduced length L2 can be achieved, for example, by providing a chamfer 948 to the lower abutment surface 946. As will be further explained below, the reduced length L2 increases the contact pressure between the lower abutment surface 946 and the lower abutment leg 980 of the brake clip 902, which in turn increases the contact pressure between the lower abutment leg 980 and the lower contact surface 925I of the anchor bracket 922. This configuration prevents or otherwise reduces debris that is allowed to enter between the lower abutment surface 946 of the backing plate 940 and the lower contact surface 925I of the anchor bracket 922. In the event that debris does enter between the lower abutment surface 946 and the lower contact surface 925I, the increased contact pressure is configured to fragment such debris for removal thereof. Thus, it should be appreciated that the lower abutment surface 946 may have any desired length.

Figure 14C:
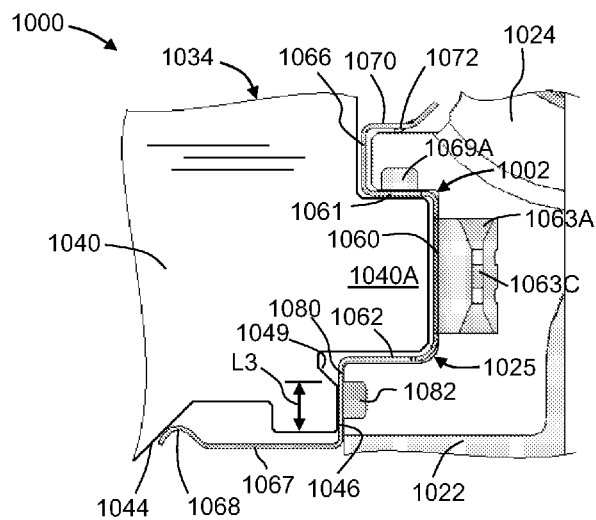
FIG. 14C is a side view of a portion of a disc brake assembly showing the brake clip illustrated in FIGS. 12 and 13 installed on an anchor bracket in accordance with a tenth embodiment of the present invention.

Referring now to FIG. 14C, there is illustrated a disc brake assembly, indicated generally at 1000, in accordance with a tenth embodiment of the present invention. The illustrated disc brake assembly 1000 includes a brake clip 1002, an anchor bracket 1022, and a brake pad 1034. The brake clip 1002, the anchor bracket 1022, and the brake pad 1034 may include any structural features as described and illustrated above in the previous embodiments, although such is not required. Similar features have been numbered with common reference numerals but have been increased to 1000 (e.g. 1002, 1022, 1032, 1042, etc.). It should be appreciated that similar features are structured similarly, operate similarly, and/or have the same function unless otherwise indicated by the drawings or this specification.

For example, the illustrated brake clip 1002 includes a base leg 1060, upper and lower legs 1061 and 1062, a pair of retaining members 1063A and 1063B (not shown), a first support leg 1066, a second support leg 1070, a lower abutment leg 1080, and an extension leg 1067. It should be appreciated, however, that the brake clip 1002 may include any desired structural features.

The illustrated brake pad 1034 includes a backing plate 1040. As shown, the backing plate 1040 includes an outwardly projecting guide rail 1040A formed thereon. The guide rail 1040A is configured to support the brake pad 1034 for sliding movement within a channel 1025 of the anchor bracket 1022. The brake pad 1034 further includes a lower abutment surface 1046. The lower abutment surface 1046 extends downwardly from or is otherwise located adjacent the guide rail 1040A. The lower abutment surface 1046 may be configured to generally correspond with the lower abutment leg 1080 of the brake clip 1002, although such is not required.

In the illustrated embodiment, the lower abutment surface 1046 of the backing plate 1040 has a reduced length L3 as compared to the length L1 described above in FIG. 14. The reduced length L3 can be achieved, for example, by providing a relief 1049 in the lower abutment surface 1046. As briefly described above, the reduced length L3 increases the contact pressure between the lower abutment surface 1046 and the lower abutment leg 1080 of the brake clip 1002, which in turn increases the contact pressure between the lower abutment leg 1080 and the lower contact surface 1025I of the anchor bracket 1022. This configuration prevents or reduces debris that is allowed to enter between the lower abutment surface 1046 of the backing plate 1040 and the lower contact surface 1025I of the anchor bracket 1022. In the event that debris does enter between the lower abutment surface 1046 and the lower contact surface 1025I, the increased contact pressure is configured to fragment such debris for removal thereof. It should be appreciated that the lower abutment surface 1046 may have any desired length.

Figure 15:
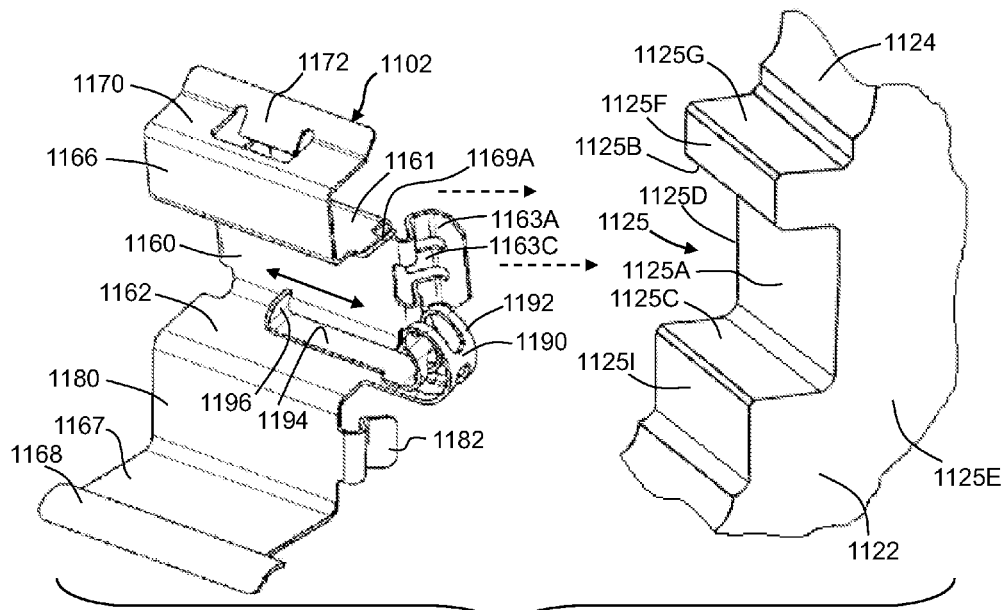
FIG. 15 is an exploded perspective view of a brake clip in accordance with an eleventh embodiment of the present invention prior to installation on an anchor bracket which is partially illustrated therein.
Figures 16, 17:
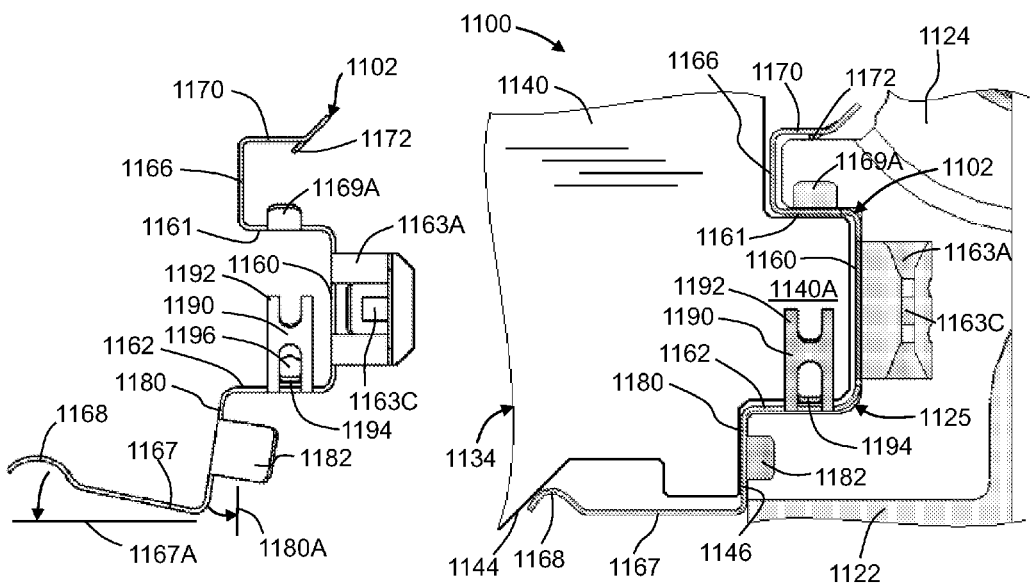
FIG. 16 is a side elevational view of the brake clip illustrated in FIG. 15 showing the brake clip in an uninstalled position.
FIG. 17 is a side view of a portion of a disc brake assembly showing the brake clip illustrated in FIGS. 15 and 16 installed on an anchor bracket.

Referring now to FIGS. 15 through 17, there is illustrated a brake clip 1102 and an anchor bracket 1122 including a channel, indicated generally at 1125, in accordance with an eleventh embodiment of the present invention. The brake clip 1102 and the channel 1125 may include any structural features as described and illustrated above in the previous embodiments, although such is not required. Similar features have been numbered with common reference numerals but have been increased to 1100 (e.g. 1102, 1122, 1132, etc.). It should be appreciated that similar features are structured similarly, operate similarly, and/or have the same function unless otherwise indicated by the drawings or this specification.

For example, the illustrated brake clip 1102 includes a base leg 1160, upper and lower legs 1161 and 1162, a pair of retaining members 1163A and 1163B (not shown), a first support leg 1166, a second support leg 1170, a lower abutment leg 1180, and an extension leg 1167. The illustrated brake clip 1102 further preferably includes a retractor clip 1190. As shown, the retractor clip 1190 extends along the lower leg 1162 of the brake clip 1102. The retractor clip 1190 includes a spring portion 1192, a retraction leg 1194, and a contact lip 1196. The spring portion 1192 connects the retraction leg 1194 to an outboard edge of the lower leg 1162 of the brake clip 1102. The spring portion 1192 is embodied as a plurality of elastically deformable spring arms that allow the retraction leg 1194 to move in a side-to-side motion along the lower leg 1162, as indicated by the arrow shown in FIG. 15. It should be appreciated, however, that the spring portion 1192 can be any elastically deformable structure as desired. Thus, the retractor clip 1190 is configured to retract the brake pad 1134 from contact with a brake rotor (not shown) when a brake pedal (also not shown) has been released.

In operation, as shown in FIG. 17, the retraction leg 1194 extends beneath a lower surface of a guide rail 1140A of a brake pad 1134. The contact lip 1196 is located at an end portion of the retraction leg 1194 and contacts a side of the guide rail 1140A that faces inwardly toward the brake rotor (not shown). Thus, when the disc brake assembly is no longer being actuated, the retractor clip 1190 is configured to retract the brake pad 1134 from contact with the brake rotor.

It should be appreciated that the present invention provides numerous advantages over previously known brake clips. One advantage of the present invention is provided by the retention tabs disclosed in each of the embodiments of the associated brake clip, such as for example the retention tabs 164A and 164B in connection with the first embodiment of the brake clip 102. The retention tabs 164A and 164B can positively secure the brake clip 102 to the anchor bracket 122 thereby reducing noise and vibrations between various components of the disc brake assembly 100. Further, the retention tabs 164A and 164B can also prevent or reduce the intake and accumulation of debris (e.g. brake dust, corrosion, etc.) behind the brake clip 102 by eliminating pivotal movement of the brake clip 102.

Another advantage of the present invention is provided by the opposing channels and the corresponding retaining tabs disclosed in the associated embodiments, such as for example the opposing grooves 129A and 129B and the corresponding retaining tabs 164A and 164B in connection with the first embodiment. The opposing grooves 129A and 129B and the corresponding retaining tabs 164A and 164B can ensure that the brake clip 102 maintains zero clearance with the inner surfaces of the channel 125 (i.e. prevents pivotal movement of the brake clip 102 relative to the channel 125), regardless of manufacturing tolerance and dimensional stack-ups and during all operating conditions. Further, this configuration may also reduce the necessary radial packaging by providing the retention feature within the channel 125 as opposed to external retention features, such as the retaining members 163A and 163B described above for example.

Numerous other advantages of the present invention are provided by the extension leg of the brake clip disclosed in the associated embodiments, such as for example the extension leg 167 of the brake clip 102 in connection with the first embodiment. In one example, the extension leg 167 is configured to generate a spring force against the brake pad 134 thereby reducing rattle noise. In another example, the extension leg 167 is in contact with the lower angled surface 144 of the backing plate 140. As a result, the extension leg 167 provides both tangential and radial damping to improve rattle performance (i.e. reduce noise and vibrations) of the brake clip 102. In yet another example, the extension leg 167 can prevent or substantially reduce the intake and accumulation of debris behind the brake clip 102 by creating contact pressure between the lower leg 162 of the brake clip 102 and the lower surface 125C of the channel 125. In yet another example, the extension leg 167 contacts the backing plate 140 outside of a region that is defined by the guide rail 140A. This configuration enables the geometry of the backing plate 140 to be modified for adjusting the spring force of the extension leg 167 to accommodate brake pads of various weights and a range of vehicle dynamics. Thus, the brake clip 102 can be used as a standard part for brake pads of various sizes. It should be appreciated, however, that the extension leg 167 may provide additional advantages which are not disclosed herein.

Another advantage of the present invention is provided by the second support leg of the brake clip disclosed in the associated embodiments, such as for example the second support leg 670 of the brake clip 602 in connection with the sixth embodiment. The second support leg 670 is configured to prevent or further reduce debris from entering behind the first support leg 666 and accumulating behind the brake clip 602.

Another advantage of the present invention is provided by the retention tab in the second support leg of the brake disclosed in the associated embodiments, such as for example the retention tab 672 in the second support leg 670 in connection with the sixth embodiment. The retention tab 672 is configured to prevent or resist pivotal movement of the brake clip 602 relative to the channel 625. Thus, the retention tab 672 can assist in the reduction of rattle noise and reduce debris from accumulating behind the brake clip 602.

Numerous other advantages of the present invention are provided by the lower abutment leg of the brake clip disclosed in the associated embodiments, such as for example the lower abutment leg 780 of the brake clip 702 in connection with the seventh embodiment. In one example, the lower abutment leg 780 helps to reduce movement of the brake clip 702 relative to the anchor bracket 722. In another example, the lower abutment leg 780 can reduce the amount of channels or grooves that are otherwise needed to securely fasten the brake clip 702 to the anchor bracket 722. In yet another example, the lower abutment leg 780 provides a low abutment location, which decreases the moment arm (i.e. abutment distance from the trailing mounting bolt). In yet another example, the lower abutment leg 780 allows for packaging of a sheet metal wear indicator (not shown) between the brake clip 702 and the backing plate 740 of the brake pad 734. In yet another example, the contact pressure at the lower abutment location can be easily tuned by modifying the length L1 of the lower abutment surface 746 on the backing plate 740, without any modification to the brake clip 702. The contact pressure at the lower abutment location can be used to reduce the intake of debris and otherwise fragment debris that has accumulated between the brake clip 702 and the anchor bracket 722. In yet another example, the lower abutment leg 780 allows for a lower spring force that acts against the lower angled surface 744 by providing a longer extension leg 767. In yet another example, one set of brake clips 702 (i.e. inboard and outboard clips) can fit onto brake calipers of various sizes, from small single pots to large twin pots. It should be appreciated, however, that the lower abutment leg 780 may provide additional advantages which are not disclosed herein.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A singular brake clip for use with a disc brake assembly and configured to be disposed between at least only one of a pair of guide rails of a brake pad of the disc brake assembly and an anchor bracket of the disc brake assembly, the brake clip comprising:
    a U-shaped section including a base leg with opposing upper and lower legs extending from the base leg, the base leg including a pair of retaining members that extend in a rearward direction from opposite edges of the base leg, each of the retaining members of the base leg includes a retention tab;
    an abutment leg extending from the lower leg of the U-shaped section, the abutment leg including a retention member provided on an outboard side thereof, the retention member of the abutment leg is configured to extend from the abutment leg in a rearward direction along a side surface of an anchor bracket;
    an extension leg extending from the abutment leg, wherein the abutment leg is in direct contact with at least a portion of both the anchor bracket and a brake pad of the disc brake assembly and the extension leg includes a lip portion which is in direct contact with at least a portion of the brake pad of the disc brake assembly when the brake clip is disposed therebetween;
    a first support leg that extends generally perpendicular from the upper leg; and
    a second support leg that includes at least a portion thereof that extends substantially perpendicular from the first support leg, wherein the second support leg includes a retention tab.

2. The brake clip of claim 1, wherein the abutment leg extends generally perpendicular from the lower leg of the U-shaped section.

3. The brake clip of claim 1, wherein at least one of the upper and lower legs of the U-shaped section includes a retention tab extending outwardly from a surface thereof.

4. The brake clip of claim 1 wherein the retention tab of the second support leg extends downwardly from a surface of the second support leg toward the upper leg of the U-shaped section.

5. The brake clip of claim 1, further including a retractor clip extending along one of the first and second legs of the U-shaped section.

6. The brake clip of claim 1, wherein in both the uninstalled and installed state the abutment leg is oriented substantially perpendicular relative to the extension leg.

7. A brake pad and clip assembly for use with a disc brake assembly, the brake pad and clip assembly comprising:
    a brake pad including a pair of guide rails; and
    a singular brake clip adapted to be disposed between at least only one guide rail of the brake pad and an anchor bracket of the disc brake assembly, the brake clip including:
    a U-shaped section including a base leg with opposing upper and lower legs extending from the base leg, the base leg including a pair of retaining members that extend in a rearward direction from opposite edges of the base leg, each of the retaining members of the base leg includes a retention tab;
    an abutment leg extending from the lower leg of the U-shaped section, the abutment leg including a retention member provided on an outboard side thereof, the retention member of the abutment leg is configured to extend from the abutment leg in a rearward direction along a side surface of an anchor bracket; and
    an extension leg extending from the abutment leg, wherein the abutment leg is in direct contact with at least a portion of both the anchor bracket and the brake pad and the extension leg includes a lip portion which is in direct contact with at least a portion of the brake pad when the brake clip is disposed therebetween;
    a first support leg that extends generally perpendicular from the upper leg; and
    a second support leg that includes at least a portion thereof that extends substantially perpendicular from the first support leg, wherein the second support leg includes a retention tab;
    wherein in an uninstalled state, the abutment leg is oriented offset and non-parallel relative to the base leg and the extension leg is oriented offset and non-parallel relative to lower leg, and wherein in an installed state the abutment leg is deflected and oriented offset and substantially parallel relative to the base leg and the extension leg is deflected and oriented offset and substantially parallel relative to the lower leg.

8. The brake pad and clip assembly of claim 7, wherein the brake pad further includes an abutment surface that is in contact with the abutment leg of the brake clip when the brake clip is disposed between the brake pad and the anchor bracket.

9. The brake pad and clip assembly of claim 8, wherein the abutment surface includes one of a chamfer and a relief for reducing the contact area between the abutment surface and the abutment leg of the brake clip.

10. The brake pad and clip assembly of claim 7, wherein the guide rail of the brake pad includes two protrusions that are spaced apart from one another and in contact with the U-shaped section of the brake clip when the brake clip is disposed between the brake pad and the anchor bracket.

11. The brake pad and clip assembly of claim 7, wherein the brake pad includes a surface that is angled relative to at least one of the first and second legs of the U-shaped section of the brake clip, and the lip portion of the extension leg of the brake clip is in contact with the angled surface when the brake clip is disposed between the anchor bracket and the brake pad.

12. The brake pad and clip assembly of claim 7 wherein the retention tab of the second support leg extends downwardly from a surface of the second support leg toward the upper leg of the U-shaped section.

13. The brake pad and clip assembly of claim 7, wherein in both the uninstalled and installed state the abutment leg is oriented substantially perpendicular relative to the extension leg.

14. A disc brake assembly comprising:
an anchor bracket having a channels formed therein that includes a rear surface and opposing first and second surfaces extending from the rear surface, the anchor bracket further including a contact surface extending from one of the first and second surfaces of the channel;
a brake pad including a pair of guide rails disposed within the channels of the anchor bracket; and
a singular brake clip configured to be disposed between the channel of the anchor bracket and at least only one guide rail of the brake pad, the brake clip including:
a U-shaped section having a base leg with opposing upper and lower legs extending from the base leg, the base leg including pair of retaining members that extend in a rearward direction from opposite edges of the base leg, each of the retaining members of the base leg includes a retention tab;
an abutment leg extending from the lower leg of the U-shaped section, the abutment leg including a retention member provided on an outboard side thereof, the retention member of the abutment leg is configured to extend from the abutment leg in a rearward direction along a side surface of an anchor bracket; and
an extension leg extending from the abutment leg, wherein the abutment leg is in direct contact with at least a portion of both the anchor bracket and the brake pad and the extension leg includes a lip portion which is in direct contact with at least a portion of the brake pad;
a first support leg that extends generally perpendicular from the upper leg; and
a second support leg that includes at least a portion thereof that extends substantially perpendicular from the first support leg, wherein the second support leg includes a retention tab;
wherein in an uninstalled state, the abutment leg is oriented offset and non-parallel relative to the base leg and the extension leg is oriented offset and non-parallel relative to lower leg, and wherein in an installed state the abutment leg is deflected and oriented offset and substantially parallel relative to the base leg and the extension leg is deflected and oriented offset and substantially parallel relative to the lower leg.

15. The disc brake assembly of claim 14, wherein the contact surface of the anchor bracket extends generally perpendicular from at least one of the first and second surfaces of the channel.

16. The disc brake assembly of claim 14, wherein the brake pad further includes an abutment surface in contact with the abutment leg of the brake clip.

17. The disc brake assembly of claim 14, wherein at least one of the first and second surfaces of the channel in the anchor bracket includes a groove, and at least one of the first and second legs of the U-shaped section of the brake clip includes a retention tab that is received within the groove.

18. The disc brake assembly of claim 14, wherein the brake pad includes a surface that is angled relative to at least one of the first and second legs of the U-shaped section of the brake clip, and the extension leg of the brake clip is in contact with the angled surface.

19. The disc brake assembly of claim 14, wherein the anchor bracket includes a ledge having a front surface extending from one of the first and second surfaces and a top surface extending from the front surface, and wherein the first support leg extends along the front surface of the ledge and the second support leg extends from the first support leg along the top surface of the ledge.

20. The disc brake assembly of claim 14, wherein the brake clip further includes a retractor clip extending along one of the first and second legs of the U-shaped section.

21. The disc brake assembly of claim 14 wherein the retention tab of the second support leg extends downwardly from a surface of the second support leg toward the upper leg of the U-shaped section.

22. The disc brake assembly of claim 14, wherein in both the uninstalled and installed state the abutment leg is oriented substantially perpendicular relative to the extension leg.

23. The disc brake assembly of claim 14, wherein the anchor bracket includes four channels, a pair of brake pads is provided each having a pair of guide rails, and wherein four brake clips are provided and disposed between the four channels of the anchor bracket and the guide rails of the pair of brake pads.

24. A brake pad and clip assembly for use with a disc brake assembly, the brake pad and clip assembly comprising:
a brake pad including a pair of guide rails, wherein at least one of the guide rails includes at least two protrusions that are spaced apart from one another; and
a singular brake clip configured to be disposed between an anchor bracket of the disc brake assembly and at least only one guide rail of the brake pad, the brake clip including a U-shaped section having a base leg with opposing upper and lower legs extending from the base, the base leg including a pair of retaining members that extend in a rearward direction from opposite edges of the base leg, each of the retaining members of the base leg includes a retention tab, an abutment leg extending from lower leg of the U-shaped section, the abutment leg including a retention member provided on an outboard side thereof, the retention member of the abutment leg is configured to extend from the abutment leg in a rearward direction along a side surface of an anchor bracket, an extension leg extending from the abutment leg, wherein the abutment leg is in direct contact with at least a portion of both an anchor bracket of the disc brake assembly and the extension leg includes a lip portion which is in direct contact with at least a portion of the brake pad, a first support leg that extends generally perpendicular from the upper leg, and
a second support leg that includes at least a portion thereof that extends substantially perpendicular from the first support leg, wherein the second support leg includes a retention tab, and wherein the U-shaped section receives the guide rail of the brake pad therein such that the at least two protrusions of the guide rail are in contact with the U-shaped section of the brake clip when the brake pad and brake clip are assembled on the disc brake assembly;

wherein in an uninstalled state, the abutment leg is oriented offset and non-parallel relative to the base leg and the extension leg is oriented offset and non-parallel relative to lower leg, and wherein in an installed state the abutment leg is deflected and oriented offset and substantially parallel relative to the base leg and the extension leg is deflected and oriented offset and substantially parallel relative to the lower leg.

25. The brake pad and clip assembly of claim 24 wherein the retention tab of the second support leg extends downwardly from a surface of the second support leg toward the upper leg of the U-shaped section.

26. The brake pad and clip assembly of claim 24, wherein in both the uninstalled and installed state the abutment leg is oriented substantially perpendicular relative to the extension leg.

* * * * *

UNITED STATES PATENT AND TRADEMARK OFFICE
CERTIFICATE OF CORRECTION

PATENT NO. : 9,568,055 B2  Page 1 of 1
APPLICATION NO. : 13/359124
DATED : February 14, 2017
INVENTOR(S) : Harry Miller et al.

It is certified that error appears in the above-identified patent and that said Letters Patent is hereby corrected as shown below:

In the Claims

Column 21, Claim 14, Line 19, after "bracket having", delete "a".

Signed and Sealed this
Eleventh Day of April, 2017

Michelle K. Lee
*Director of the United States Patent and Trademark Office*